United States Patent
Conan et al.

(10) Patent No.: US 6,810,364 B2
(45) Date of Patent: Oct. 26, 2004

(54) AUTOMATED TESTING OF COMPUTER SYSTEM COMPONENTS

(75) Inventors: Chan Ming Yam Terence Conan, Markham (CA); Shing Choy Hung, Markham (CA); Wing Kit Kwan, Richmond Hill (CA); King Keung Lam, Markham (CA); Aaron Wai-lun Lum, Scarborough (CA); Kenneth Ka Wah Ng, Toronto (CA); Johnny Yee-lun Nge, Markham (CA); Bin Wu, Don Mills (CA)

(73) Assignee: International Business Machines Corporation, Armonk, NY (US)

(*) Notice: Subject to any disclaimer, the term of this patent is extended or adjusted under 35 U.S.C. 154(b) by 207 days.

(21) Appl. No.: 09/772,474

(22) Filed: Jan. 30, 2001

(65) Prior Publication Data

US 2001/0012986 A1 Aug. 9, 2001

(30) Foreign Application Priority Data

Feb. 4, 2000 (CA) .............................. 2297994

(51) Int. Cl.$^7$ .............................. G06F 11/30
(52) U.S. Cl. ............................................ 702/188
(58) Field of Search ................... 702/188, 189, 702/123; 320/134; 705/75; 714/38, 124, 46, 819, 35; 73/38; 717/744, 133; 345/744; 709/328, 208, 239; 716/12

(56) References Cited

U.S. PATENT DOCUMENTS

| 5,754,760 A | * | 5/1998 | Warfield .................. 714/35 |
| 5,781,720 A | * | 7/1998 | Parker et al. ............. 714/38 |
| 5,790,117 A | * | 8/1998 | Halviatti et al. ........ 345/744 |
| 5,909,544 A | * | 6/1999 | Anderson et al. ......... 709/208 |
| 6,058,493 A | * | 5/2000 | Talley ..................... 714/38 |
| 6,154,876 A | * | 11/2000 | Haley et al. ............ 717/133 |
| 6,279,124 B1 | * | 8/2001 | Brouwer et al. .......... 709/328 |
| 6,526,526 B1 | * | 2/2003 | Dong et al. .............. 714/46 |

OTHER PUBLICATIONS

The PC bible $2^{nd}$ edition by Eric Knorr, 1995 (p. 904, 945–951, 953–956, 965–967).*

* cited by examiner

*Primary Examiner*—John Barlow
*Assistant Examiner*—Tung S Lau
(74) *Attorney, Agent, or Firm*—Derek S. Jennings; Anne V. Dougherty (57) ABSTRACT

A system for the automated testing of software in a distributed environment. A system server includes a test bucket for storing test data. System resource availability data is maintained in the system server. Test requests submitted by a user are processed by the system server. Upon appropriate resource availability a dynamic test script is generated by the system server and sent to appropriate client machines for execution. Client processes on the client machines manage the execution of the tests. Client machines return test results to the system server for generation of a test report.

22 Claims, 3 Drawing Sheets

AUTOMATED TESTING OF COMPUTER SYSTEM COMPONENTS

FIELD OF THE INVENTION

The present invention is directed to an improvement in computing systems and in particular to computer systems which provide for the automated testing of computer system components.

BACKGROUND OF THE INVENTION

Part of the development of a computer system is a testing phase to identify errors in the program code for the system and to determine whether the system specifications have been met. It is important that the testing of software for computer systems be complete and rigorous. Different tools have been developed to aid in the testing of software.

For a client-server or web-based software system, such as an electronic commerce product, testing of the system component software is potentially complex. This complexity arises because a web-based product may run on many different platforms, and be used by different web browsers and servers. The system may also access databases which are distributed widely over different networks. The distributed nature of the system and its complexity may require the use of different testing tools for software verification. These factors affecting the testing of computer system components may apply to electronic commerce products, as well as to other software developed for use in distributed client-server architecture systems such as internet and intranet environments.

This potentially complex testing phase for system development typically requires significant time and effort from software developers to define and conduct tests on different systems with different testing tools, and to manage the results of the testing once it has been carried out.

It is therefore desirable to have a computer system which will manage the testing of complex client-server software products using the appropriate testing tools on available system resources and which will collect the results of such tests.

SUMMARY OF THE INVENTION

According to one aspect of the present invention, there is provided an improved system for the automated testing of software.

According to another aspect of the present invention, there is provided a system for automated testing of software, the system having a system server component including, a test bucket for storing sets of test data, a job receiver process, for accepting test requests from a user, each test request including an identifier for selecting test data from the test bucket, a resource process and resource pool for managing system resource data to indicate resources available for software testing on a set of client computer systems, a job execution process for creating test script execution data based on the test data identified in a test request, the job execution process receiving the test request from the job receiver process, the dynamic test script being created upon the resource pool indicating the availability of resources required for the execution of the dynamic test script on one or more of the set of client computer systems, the job execution process initiating testing by forwarding the test execution script data to the appropriate one or more of the set of client computer systems, the system server component further comprising a means for accepting and storing test results from the set of client computer systems.

According to another aspect of the present invention, there is provided the above system further including a client process component, the client process component being executable on one or more of the set of client computer systems and having a listener process for accepting test execution script data from the system server component, a test execution process for carrying out the testing specified by test execution script data provided by the listener process, and for generating a test report and for communicating the test report to the system server component.

According to another aspect of the present invention, there is provided the above system further including a web servlet component providing a graphical user interface for use by the user in defining a test request and a parser component for parsing ASCII format test requests defined by the user.

According to another aspect of the present invention, there is provided the above system further including an active job queue and a dispatcher process, job receiver process placing test requests on the active job queue upon receipt, the dispatcher process determining when a subject test request on the active job queue is matched by available system resources as indicated by the resource pool and providing the subject test request to the job execution process.

According to another aspect of the present invention, there is provided the above system further including a complete job queue for receiving test requests from the job execution process upon the completion of the testing defined by the test request.

According to another aspect of the present invention, there is provided the above system further including a database for the storage of test results received by the job execution process and in which the system server component comprises TCP/IP sockets for accepting test requests and communicating with the set of client systems.

According to another aspect of the present invention, there is provided the above system further including a listener process for generating a test script file from the test script data received from the system server component and which test script file used by the test execution process to define the testing carried out by the client process.

According to another aspect of the present invention, there is provided the above system in which the client process further comprises a control process for receiving control queries and commands from the system server component and for responding to the control queries and commands and in which the job execution process in the system server component further comprises means for generating control queries and commands and for receiving responses to the control queries and commands.

According to another aspect of the present invention, there is provided the above system further including an automated machine refresh subsystem responsive to a refresh command. In which the subsystem includes a stored machine image, a refresh script for modification of the boot.ini and autoexec.bat files on client system computers, the modified autoexec.bat file being configured to modify the boot.ini file and execute drive image software for loading the stored machine image and for rebooting the system into the non-DOS operating system for software testing.

According to another aspect of the present invention, there is provided a computer program product for use with a computer comprising a central processing unit and random access memory, said computer program product comprising a computer usable medium having computer readable code means embodied in said medium for software testing in distributed systems, said computer program product comprising computer readable program code means for causing a computer implement the above system.

According to another aspect of the present invention, there is provided a computer program product tangibly embodying a program of instructions executable by a computer for implementing the above system for automated testing of software.

Advantages of the present invention include a framework for easy integration of alternative test tools and the deployment of appropriate test target machines without specifying either the physical or the logical machine location by the user. The system also requires no user modification to a defined test case to permit execution of the test case on different target machines.

BRIEF DESCRIPTION OF THE DRAWINGS

The preferred embodiment of the invention is shown in the drawings, wherein.

In the drawings, the preferred embodiment of the invention is illustrated by way of example. It is to be expressly understood that the description and drawings are only for the purpose of illustration and as an aid to understanding, and are not intended as a definition of the limits of the invention.

DETAILED DESCRIPTION OF THE PREFERRED EMBODIMENT

Figure 1:
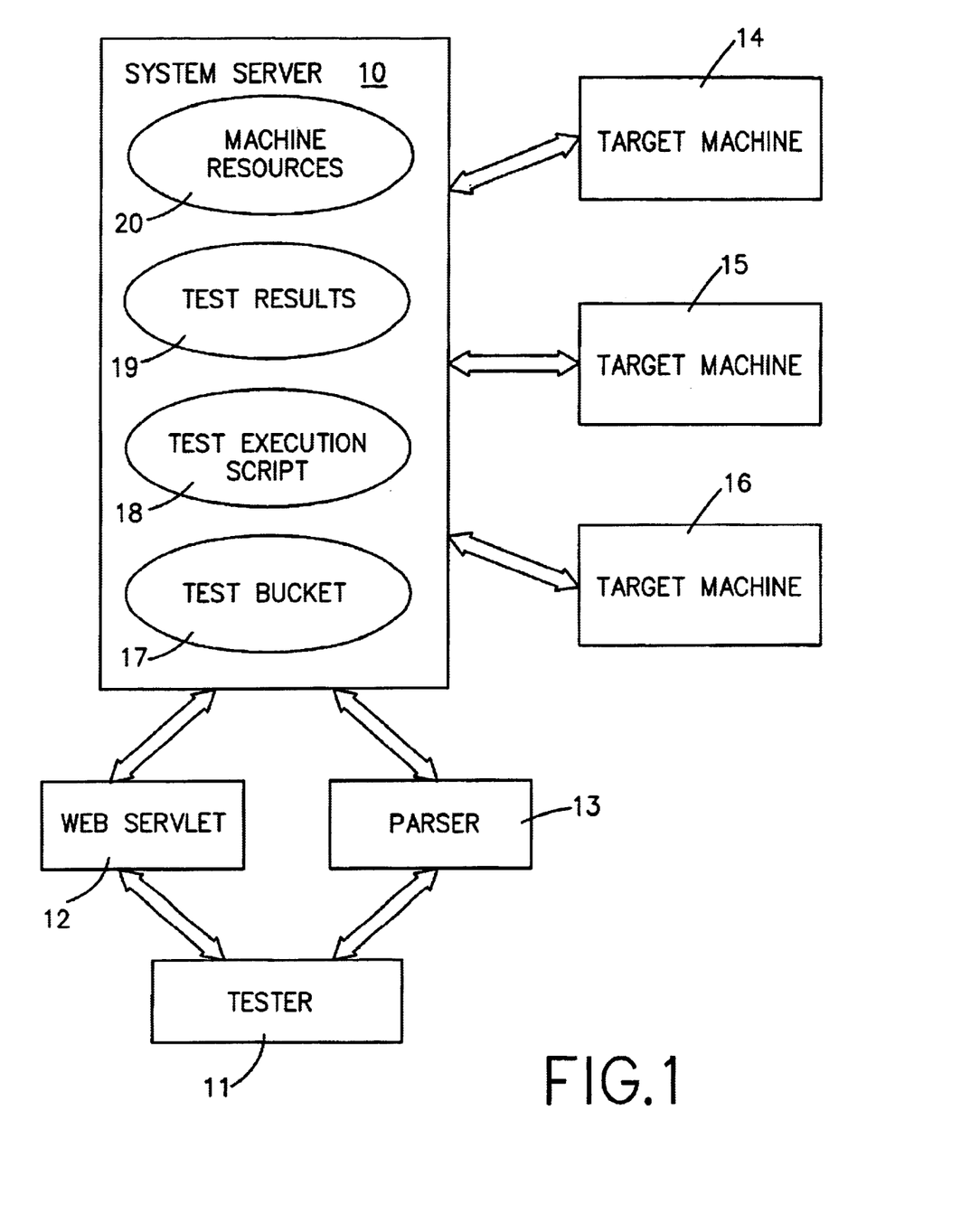
FIG. 1 is a block diagram showing test execution workflow for the system of the preferred embodiment.

The system of the preferred embodiment is illustrated by way of the example shown in the block diagram of FIG. 1 which may be used to show the workflow of the preferred embodiment's test execution. FIG. 1 shows system server 10, and tester 11 (the user of the system). Tester 11 uses web servlet 12 or parser 13 to interact with system server 10. System server 10 manages testing on one or more of target machines 14, 15, 16. Server 10 includes test bucket 17, test execution script 18, test results data 19 and machine resources data 20.

Figure 2:
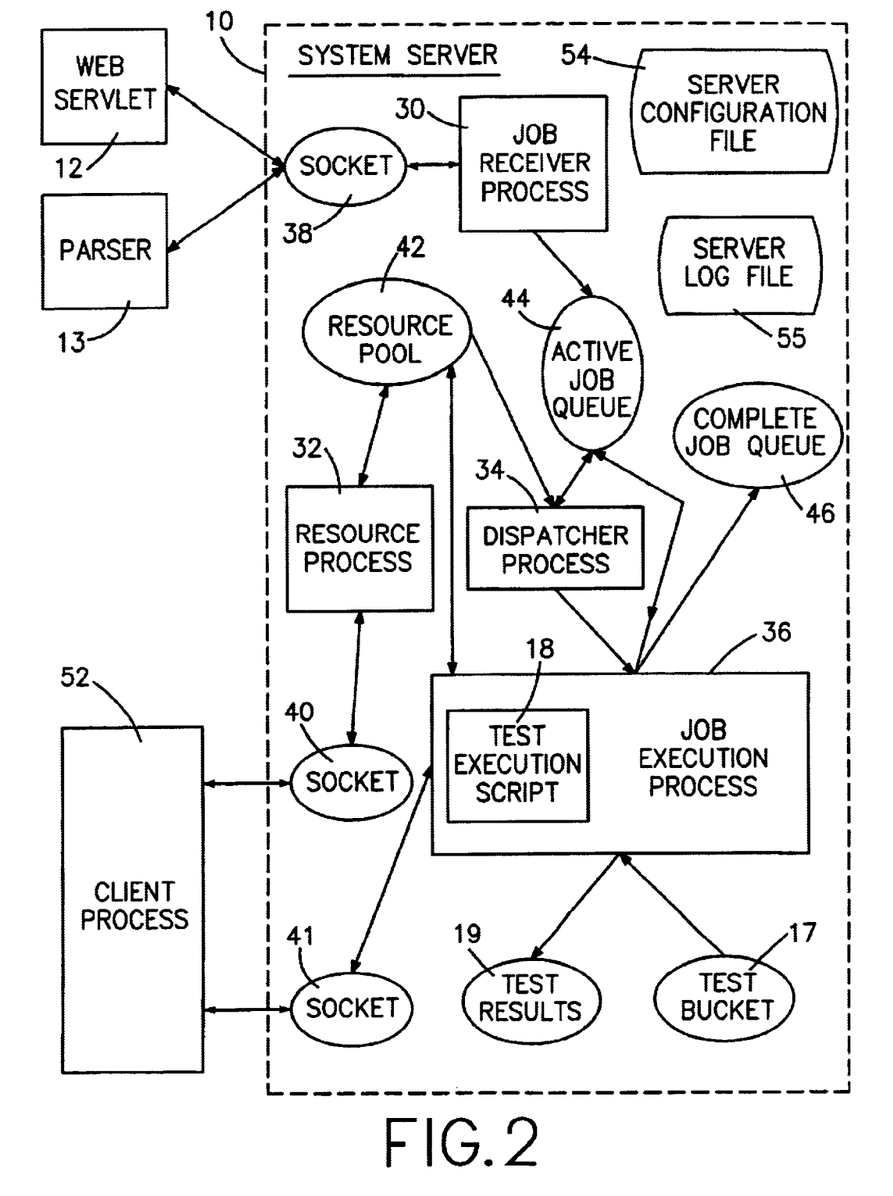
FIG. 2 is a block diagram showing the architecture of the server-resident components of the system of the preferred embodiment.

FIG. 2 is a block diagram showing the process interaction for preferred embodiment system server 10. The components of system server 10, as shown in FIG. 2, include job receiver process 30, resource process 32, dispatcher process 34 and job execution process 36. Sockets 38, 40, 41 are shown in FIG. 2 and are used by system server 10. System server 10 accesses the three data resources shown in FIG. 2, resource pool 42, active job queue 44 and complete job queue 46. Test bucket data 17 and test result data 19 are also shown in system server 10. FIG. 2 also shows web servlet 12 and parser 13 which are used to submit jobs to the system server 10 by way of socket 38. Client process 52 in FIG. 2 represents one of the processes which may potentially run on one of target machines 14, 15, 16 in the example of FIG. 1. FIG. 2 also includes server configuration file 54 and server log file 55. As is shown in FIG. 2, in the preferred embodiment, web servlet 12, parser 13 and client process 52 are located remote from system server 10 and communicate by way of network protocols (such as TCP/IP) which are supported by sockets 38, 40, 41.

Figure 3:
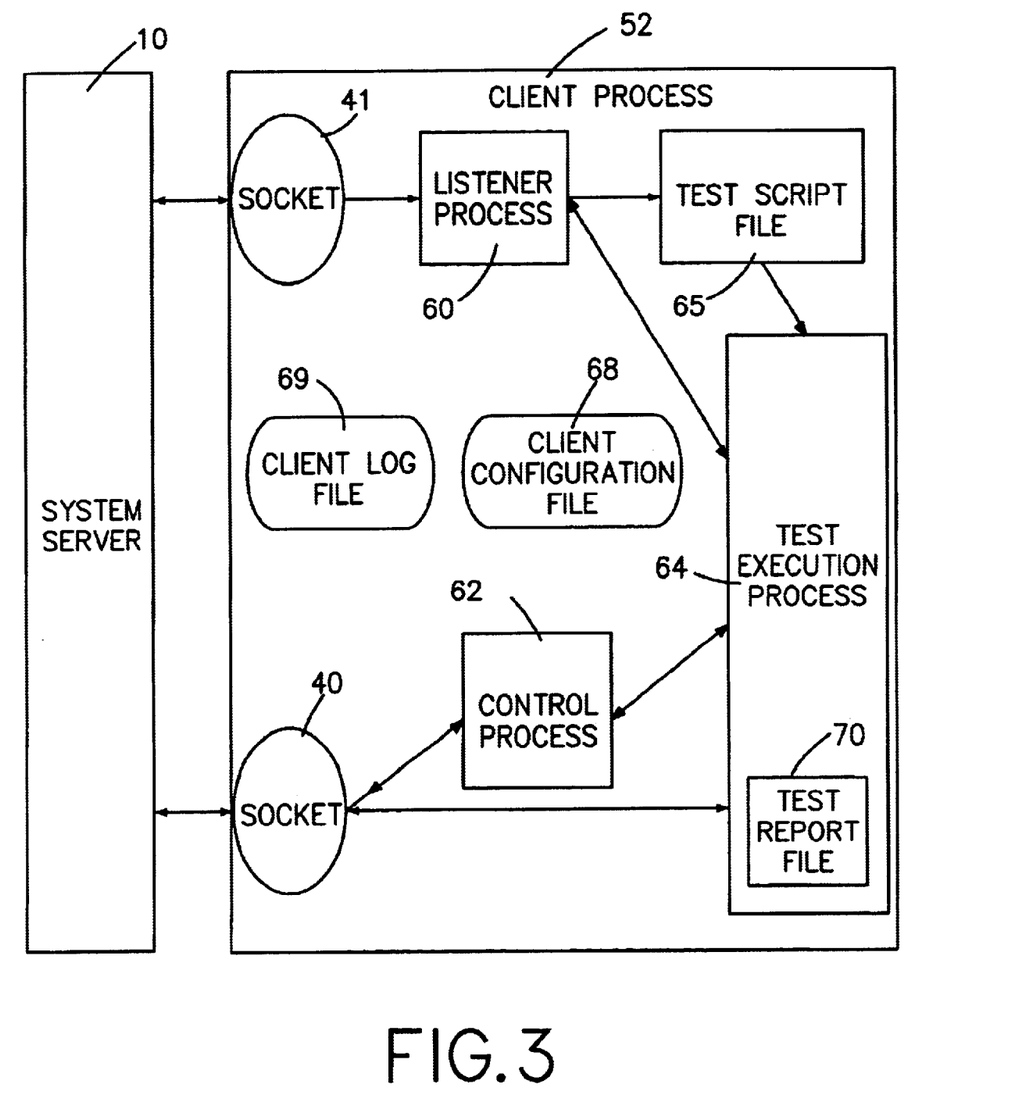
FIG. 3 is a block diagram showing the architecture of the client-resident components of the system of the preferred embodiment.

FIG. 3 is a block diagram showing, the internal processes of client process 52. Client process 52 has listener process 60, control process 62, and test execution process 64. The block diagram of FIG. 3 shows test script file 65, client configuration file 68, client log file 69, and test report file 70. In FIG. 3 sockets 40, 41 are shown to permitting interaction between system server 10 and client process 52.

As is apparent from the client-server architecture of the system of the preferred embodiment, the system may have a single system server 10 and multiple client processes each of which has an architecture similar to representative client process 52 shown in detail in FIG. 3. The system of the preferred embodiment is implemented in the PERL scripting language. As is apparent to those skilled in the art, the implementation of the system may be carried out with other languages in other suitable client-server environments.

As indicated above, the workflow of the system of the preferred embodiment may be described with reference to FIG. 1. The system of the preferred embodiment dynamically allocates and reserves available machine resources to perform testing. As will be apparent to those skilled in the art from the description of the preferred embodiment, the system of the invention is particularly suited for regression testing of computer software components. However, the system may be implemented in other applications where testing is repetitively executed in an unattended mode in a potentially complex client-server computer system. The specific testing to be carried out by the system of the preferred embodiment is defined by information provided by tester 11 in a test request. Test invocation and execution are driven by system server 10, and progress is also monitored by system server 10. This provides a centralized management system for tester 11 while providing for actual test execution to be performed on target machines 14, 15, 16. In the system of the preferred embodiment, target machines 14, 15, 16 each are each initialized to permit desired test tools to be run, based on the test definition submitted by the tester 11. As is set out below in more detail, the refresh of target machines is a potentially significant aspect of the preferred embodiment. At the end of test execution, clients such as that shown in the figures as client process 52 generate a common format test report (test report file 70 in FIG. 3) which is sent to system server 10 for storage as part of test results data 19.

The first step shown in the example workflow of FIG. 1 is tester 11 submitting a test request to server 10. This test request is created by tester 11 using either the interactive interface of web servlet 12 or by submitting an ASCII format file to parser 13. The syntax of the test request generated by tester 11 (using the interactive interface of web servlet 12 or contained in an ASCII file for parser 13) is implementation dependent. Certain details of the test request are more fully described below. The test request of the preferred embodiment includes a specification of the test environment and the selection of test cases from within test bucket 17 so as to permit system server 10 to generate and manage the testing required by tester 11. In the system of the preferred embodiment test bucket 17 is intended to be an essentially static collection of test cases which are available to tester 11. Tester 11 uses the test request to select one or more of the test cases stored in test bucket 17 for use in any given test session. The implementation of test bucket 17 is system-specific. In the preferred embodiment, test bucket 17 is managed by a document management system.

The second step in the example workflow shown with reference to FIG. 1 is for system server 10, based on the test resource requirements in the test request, to dynamically allocate appropriate test resources. This step involves the validation of the required resources by querying machine resources data 20.

The third step is for system server 10 to dynamically generate test execution script 18 based on the test cases selected from test bucket 17 as defined by tester 11 in the test request. Test execution script 18 is dynamically generated to permit the resource allocation to be matched to the test request and to ensure that the test execution script is appropriately tailored. If necessary, system server 10 concatenates multiple tests cases set out in test bucket 17 and defined in the test request, to permit the test cases to be submitted to a client process (illustrated as client process 52 in FIG. 2) for execution.

The fourth step occurs when system server 10 issues commands resulting in execution of test cases by client processes on target machines (reproduced as target machines 14, 15, 16 in FIG. 1). Because the system of the preferred embodiment tests client-server systems, the client process 52, which is running as a client for the testing system of the preferred embodiment, may itself comprise a server machine in the context of the test being run. Client process 52 may therefore itself manage test client processes running on different machines in the distributed system available to tester 11 and indicated in machine resources data 20.

Once the fourth step has been carried out and the tests set out in the test request (and specified in test execution script 18) have been performed, the target machines (in FIG. 1, one or more of target machines 14, 15, 16) return test results to system server 10. The last step of the workflow of the system is to store the test results as part of test results data 19.

Turning to FIG. 2, a more detailed description of server system 10 is presented. Job receiver process 30, resource process 32, dispatcher process 34 and job execution process 36 run concurrently in system server 10. These processes service external TCP/IP sockets 38, 40, 41. The three data resources, resource pool 42, active job queue 44 and complete job queue 46 keep track of system information and resource management. Server configuration file 54 defines the environment for system server 10, while server log file 55 is used to record status information relating to the operations of the server. Server configuration file 54 and server log file 55 are globally accessible within system server 10.

Job receiver process 30 listens on socket 38 for a job command from either the parser 13 or web servlet 12. Both of these mechanisms may be used by tester 11 to set up a testing session in the system. Web servlet 12 potentially runs on a remote machine and provides a GUI interface to submit jobs to and to query system server 10 by a TCP/IP protocol using socket 38 as shown in FIG. 2. Alternatively, a tester may submit jobs by defining test requests which are parsed by parser 13. Both web servlet 12 and parser 13 generate job commands which are communicated by socket 38 to server 10.

On receipt of a job command, job receiver process 30 assigns a unique job identifier to the job and stores the job in active job queue 44. The status of the job in active job queue 44 is initialized to the "wait" state. The job identifier is also returned to tester 11 via socket 38.

Dispatcher process 34 runs concurrently with job receiver process 30 and searches active job queue 44 for available jobs. When a job is found, dispatcher process 34 checks whether all resources and test conditions specified by tester 11 in the test request for the job can be satisfied. If so, the job is forked by dispatcher process 34 to job execution process 36. Job execution process 36 is spawned to handle execution of tasks within the job. The job is marked as active (status changed to "work") in active job queue 44. Dispatcher process 34 determines the availability of resources for a given set of test requirements by querying resource pool 42. The data in resource pool 42 is managed by resource process 32.

The clients in the system, represented in FIG. 2 by client process 52, are registered by system server 10 (by way of socket 40). Client 52 provides information as to its resource availability which information is managed by resource process 32 and is stored in resource pool 42. In the system of the preferred embodiment, resource process 32 ping/polls client processes on a scheduled basis to ensure that the data in resource pool 42 is current. Resource process 32 provides resource booking for the system. As a result, when dispatcher process 34 queries resource pool 42, current information regarding the resources available for testing is available and suitable choices may be made to send jobs to job execution process 36.

Job execution process 36 handles the dispatched job sent by dispatcher process 34. Job execution process 36 processes each of the test execution steps defined by tester 11 and dynamically generates test script 18. It then uses socket 41 to forward test script 18 to the appropriate client process 52, along with the corresponding test command to initiate the test on client process 52. Job execution process 36 also monitors the status of the testing steps in client process 52. Job execution process 36 receives and consolidates test results from client process 52 and updates the status of the jobs accordingly. Upon completion of a job, the job is moved by job execution process 36 from active job queue 44 to complete job queue 46. Each invoked command will return a result upon completion of the command. If the test case encounters any error, the test case will fail and all its remaining tasks will be skipped. The execution status for each task may be logged in server log file 55, or in client log file 69, depending on the status of the task and how the system is configured to track processing.

After completing the execution of a job, job execution process 36 consolidates the results and generates a report, stored in test results data 19. Upon completion of the report generation the job's status is marked as "Completed" or "Failed" in active job queue 44 and moved to completed job queue 46. Resources are then returned to the system and resource pool 42 is updated.

Turning to FIG. 3, client process 52 is shown in detail. Copies of client process 52 potentially run on each of target machines 14, 15, 16, as shown in the example of FIG. 1. As indicated above, client process 52 runs on all machines configured as servers for the testing software and on all machines configured as browser client machines. Client process 52 includes three processes as shown in FIG. 3: listener process 60, control process 62 and text execution process 64. There are also two sockets 40, 41 (TCP/IP sockets in the preferred embodiment) for communications.

Listener process 60 listens on socket 40 for job commands from system server 10. On transfer of job data by system server 10, listener process 60 saves the data as files in the local client environment. In the preferred embodiment, data transferred includes test execution script 18, which is shown in FIG. 3 saved as test script file 65. In addition, other data may be transferred as part of test execution script 18 where such other data may be required by specific testing software, such as files required by the Silk™ testing program. Storing data in a file permits test execution process 64 to access the data corresponding to the dynamically generated test script 18 by accessing test script file 65 when testing is executed in client process 52.

Listening process 60 prepares the client environment based on pre-conditions (if any) defined in client configuration file 68 to ensure that execution of the test as defined in test script file 65 may be executed. Once this has happened, listening process 60 invokes the test program in text execution process 64.

Test execution process 64 runs under the same address space as listener process 60. Test execution process 64 accesses test script file 65 in carrying out the execution of the test and may create test report file 70.

After completion of the test execution, listening process 60 then modifies the client environment as defined by post-conditions set out in client configuration file 68. In the preferred embodiment, the post-conditions in the client configuration file may be undefined, in which case there is no modification of the environment after test execution.

Client process 52 also includes control process 62 which listens on socket 72 for incoming control commands. Control process 62 also registers the client resources with system server 10 on initialization and on ping/polling from system server 10. Control process 62 sends a registration command to system server 10 on initialization and processes any polling commands received from system server 10.

In addition, a user can query the system of the preferred embodiment system using a command interface which in the system of the preferred embodiment is a tool written in PERL.

In the system of the preferred embodiment tester 11 specifies, at a high level, the test desired to be carried out. The implementation of such a testing specification syntax is understood by those skilled in the art. Certain details of the preferred embodiment are, however, set out below.

Test bucket 17 in the system of the preferred embodiment is implemented by a dynamic plan tree (DPT) file. This file is defined as a tree structure with each node in the tree consisting of a test record. A test record in the system of the preferred embodiment is a data structure having a tool identifier and a test script file name. The tool identifier is a unique identifier corresponding to a software testing program available in the system of the preferred embodiment. The test script file name points to a file which has data for use in the test to be run in conjunction with the software testing program of the tool identifier. The test script file is the input for the batch mode test tool. To achieve the best results with the system of the preferred embodiment, the test tool referred to by the tool identifier in the test record must support batch mode testing.

A test request may be generated by use of web servlet 12 or submitted for parsing by parser 13. A test request is defined in the system of the preferred embodiment to include a test environment definition. This sets out the web server specifications needed for the test to run, as well as any database requirements for the testing. Also included in each test request is a test execution definition which specifies the test bucket or buckets, or records in test buckets, which are to be used for the testing. The last part of the test request definition is the test report definition which specifies the user to receive the test results and in what format the results are to be presented.

The web server information in the test environment definition for a given test request is used by resource process 32 to determine the dynamic allocation of a server machine for the testing. The test execution definition defines the test bucket and the associated test records are used to determine the file information and tool identifier to be passed to the allocated client machine (in the example of FIG. 1, one of target machines 14, 15, 16). The test result passed back from the client machine will correspond to the test report definition for the given test request.

In the system of the preferred embodiment, a standard test result format is defined as having a header, a body and a footer. The header includes information such as the job identifier, a time stamp and the tool identifier. The body of the test result is the output from the test tool for the given test script file. The footer contains a summary of execution and a time stamp for the testing.

The system of the preferred embodiment uses the system server to consolidate the test results received from the client processes running on the target machines. The consolidation includes a summary page which sets out the job identifier, time, machine and status. The detailed test results then follow in the consolidated report. Such reports may be stored in a database for the system (test cases and results in FIG. 1). In the system of the preferred embodiment, the test results are stored in a relational database to permit queries from the user and further manipulation of the test results.

The advantages of the system of the preferred embodiment include the fact that the system provides a framework for easy integration of other test tools for the system of the preferred embodiment invocation. The system also permits deployment of appropriate test target machines without specifying either the physical or the logical machine location by a tester. The system also requires no user modification to a defined test case to permit execution of the test case on any target machines.

The system of the preferred embodiment is implemented using an object oriented framework which permits flexibility in the implementation of the system.

As indicated above, client process 52 in the system of the preferred embodiment may receive a command from system server 10 to initialize, or refresh the machine on which client process 52 is running. The refresh command of the preferred embodiment is invoked because over time, a test machine environment becomes 'dirty' from the repeated installations/uninstallations and configurations/reconfigurations of drivers and other related software. On occasion, a driver installed on a 'dirty' machine will fail in testing even though the same driver installed on a 'clean' one will not. The problem is due to incomplete uninstallations, that leave files, directories and environmental settings (for example registry values in the Windows NT™ operating system) behind. In some cases the results of test on a 'dirty' machine are not reliable.

To alleviate this problem, each driver can be installed and tested on 'clean' machines. A 'clean' machine should be one that has only the operating system installed, and perhaps any additional software that is required by the driver to run. However, requiring the use of 'clean' machines creates problems of its own. It may be onerous to install the operating system, to configure it (by installing appropriate device drivers, setting up networking an so forth) and to install additional required software on a machine. If a dozen machines are used for testing, and a new driver is released on a daily basis, it may require several people working full-time to provide 'clean' machines regularly.

The system of the preferred embodiment provides an automated machine refresh (AMR) command for the Windows NT operating system. A single command entered by the tester on given target machine will initiate the refresh process. The AMR process runs unattended and is typically faster than a manual refresh. The AMR process is therefore able to be completely integrated in the system of the preferred embodiment and while the machine is refreshing, the tester is free to work on other important tasks.

The AMR process can also be used to refresh a machine to different software configurations, depending on the testing requirement. For example on one occasion, a machine could be refreshed with an installation of IBM's Universal Database™, and at another time, that same machine could be refreshed with an Oracle™ database.

As is described below, the AMR process is implemented in the system of the preferred embodiment using the popular scripting language PERL and PowerQuest's Drive Image Professional™ software. The AMR process accesses an initiating script file, and various companion files The machines on which the AMR process runs also require some preparation to support the refresh process.

In a typical test environment an "image" is made of a target machine in a "clean" state. This image is a copy of the basic configuration of the operating system environment which will be used for test execution Typically, the software which creates and restores images for Windows™ operating systems such as Windows NT™ is DOS-based imaging application. Typically, therefore, in a manual refresh of a Windows NT™ machine, the user must first shutdown and reboot the machine to DOS (i.e. boot from a DOS floppy disk). Next, the user invokes the DOS imaging software, selects an image and begins the restoration to the target machine. After the restoration has completed, the user reboots the machine to the new NT image (installed by the imaging software).

In the AMR process of the preferred embodiment, the automation of booting from NT to DOS and vice versa is achieved by installing DOS into the boot partition of the target machine and by manipulating the boot.ini and autoexec.bat files. Having DOS installed on the boot partition permits a DOS boot without using a floppy disk. Modifying the boot.ini allows the selection of a specified operating system for use on the next system restart. This modification is done by the initiating script in NT, and again by the autoexec.bat in DOS. Thus, the initial script and autoexec.bat control the booting.

The implementation of the automation of the drive image restore process depends on the image software. The system of the preferred embodiment uses PowerQuest's Drive Image Professional™ which can be invoked with a script and image file as an argument. Other software which supports script and image file arguments will also be suitable for the AMR process of the preferred embodiment.

In summary, the sequence of events for the refresh process is as follows:

1. tester executes refresh script
2. refresh script makes changes to boot.ini and autoexec.bat files and reboots the system
3. in DOS, the autoexec.bat file modifies the boot.ini and executes the drive image software
4. the drive image software performs the machine refresh and reboots the system into the appropriate operating system.

In this way, the system of the preferred embodiment may be used to test software on target machines which are easily refreshed to a clean state. The system of the preferred embodiment will also operate satisfactorily on target machines which are kept "clean" by other means.

Although a preferred embodiment of the present invention has been described here in detail, it will be appreciated by those skilled in the art, that variations may be made thereto, without departing from the spirit of the invention or the scope of the appended claims.

The embodiments of the invention in which an exclusive property or privilege is claimed are defined as follows:

1. A system for automated testing of software, the system comprising a system server component comprising,
   a test bucket for storing sets of test data,
   a job receiver process, for accepting test requests from a user, each test request comprising an identifier for selecting test data from the test bucket,
   a resource process and resource pool for managing system resource data to indicate resources available for software testing on a set of client computer systems,
   a job execution process for creating test execution script data based on the test data identified in a test request and the available resources,
   wherein the job execution process receives the test request from the job receiver process and receives input from the resource process indicating resources available for software testing,
   dynamically creates the test execution script based upon the resource pool indicating the availability of resources required for the execution of the test on one or more of the set of client computer systems, and
   initiates testing by forwarding the test execution script data to the appropriate one or more of the set of client computer systems, and
   the system server component further comprising a means for accepting and storing test results from the set of client computer systems.

2. A computer program product for use with a computer comprising a central processing unit and random access memory, said computer program product comprising a computer usable medium having computer readable code means embodied in said medium for software testing in distributed systems, said computer program product comprising:
   computer readable program code means for causing a computer to define and manage a test bucket for storing sets of test data,
   computer readable program code means for causing a computer to execute a job receiver process, for accepting test requests from a user, each test request comprising an identifier for selecting test data from the test bucket,
   computer readable program code means for causing a computer to execute a resource process for managing system a resource pool to indicate resources available for software testing on a set of client computer systems,
   computer readable program code means for causing a computer to execute a job execution process for creating test execution script data based on the test data identified in a test request and the available resources,
   wherein the job execution process receives the test request from the job receiver process and an indication of the available resources from the resource process,
   dynamically creates the test execution script data based the resource pool indicating the availability of resources required for the execution of the test on one or more of the set of client computer systems, and
   initiates testing by forwarding the test execution script data to the appropriate one or more of the set of client computer systems, and
   computer readable program code means for causing a computer to accept and store test results from the set of client computer systems.

3. A computer program product tangibly embodying a program of instructions executable by a computer for implementing a system for automated testing of software, the system comprising a system server component comprising, a test bucket for storing sets of test data, a job receiver process, for accepting test requests from a user, each test request comprising an identifier for selecting test data from the test bucket, a resource process and resource pool for managing system resource data to indicate resources available for software testing on a set of client computer systems, a job execution process for creating test execution script data based on the test data identified in a test request and the available resources by the steps of:

receiving the test request from the job receiver process and an indication of available resources from the resource process, dynamically creating test execution script data based upon the resource pool indicating the availability of resources required for the execution of the test on one or more of the set of client computer systems, and initiating testing by forwarding the test execution script data to the appropriate one or more of the set of client computer systems, and the system server component further comprising a means for accepting and storing test results from the set of client computer systems.

4. A method for use with a computer comprising a central processing unit and random access memory, said computer program product comprising a computer usable medium having computer readable code means embodied in said medium for software testing in distributed systems, said method comprising the steps at said computer of:

defining and managing a test bucket for storing sets of test data, executing a job receiver process, for accepting test requests from a user, each test request comprising an identifier for selecting test data from the test bucket, executing a resource process for managing a system resource pool to indicate resources available for software testing on a set of client computer systems, executing a job execution process for creating test execution script data based on the test data identified in a test request and the available resources, by performing the steps of:

receiving the test request from the job receiver process at the job execution process and resource availability from the resource process, dynamically creating a test execution script indicating the availability of resources required for the execution of the test on one or more of the set of client computer systems, and initiating testing at said job execution process by forwarding the test execution script data to the appropriate one or more of the set of client computer systems, and accepting and storing test results from the set of client computer systems.

5. The system of claim 1 further comprising a client process component, the client process component being executable on one or more of the set of client computer systems and comprising a listener process for accepting test execution script data from the system server component, a test execution process for carrying out the testing specified by test execution script data provided by the listener process, and for generating a test report and for communicating the test report to the system server component.

6. The system of claim 1, in which the system server further comprises an active job queue and a dispatcher process, job receiver process placing test requests on the active job queue upon receipt, the dispatcher process determining when a subject test request on the active job queue is matched by available system resources as indicated by the resource pool and providing the subject test request to the job execution process.

7. The system of claim 1 in which the system server component further comprises a database for the storage of test results received by the job execution process.

8. The system of claim 1 in which the system server comprises TCP/IP sockets for accepting test requests and communicating with the set of client systems.

9. The System of claim 1 further comprising a web servlet component providing a graphical user interface for use by the user in defining a test request.

10. The system of claim 1 further comprising a parser component for parsing ASCII format test requests defined by the user.

11. The system of claim 1 further comprising a parser component for parsing ASCII format test requests defined by the user.

12. The computer program product of claim 2 further comprising computer readable program code means for causing a computer to execute a client process component, the client process component being executable on one or more of the set of client computer systems and comprising computer readable program code means for causing a computer to execute a listener process for accepting test execution script data from the system server component, computer readable program code means for causing a computer to execute a test execution process for carrying out the testing specified by test execution script data provided by the listener process, and for generating a test report and for communicating the test report to the system server component.

13. The computer program product of claim 3, the system for automated testing of software further comprising a client process component, the client process component being executable on one or more of the set of client computer systems and comprising a listener process for accepting test execution script data from the system server component, a test execution process for carrying out the testing specified by test execution script data provided by the listener process, and for generating a test report and for communicating the test report to the system server component.

14. The system of claim 5 in which the listener process generates a test script file from the test script data received from the system server component and which test script file used by the test execution process to define the testing carried out by the client process.

15. The system of claim 5 in which the test execution process generates a report file which is returned to the system server on completion of testing.

16. The system of claim 5 in which the client process further comprises a client configuration file for selectively defined pre-testing and post-testing configuration of the client system computer on which the client process is executing.

17. The system of claim 5 in which the client process further comprises a control process for receiving control queries and commands from the system server component and for responding to the control queries and commands and in which the job execution process in the system server component further comprises means for generating control queries and commands and for receiving responses to the control queries and commands.

18. The system of claim 5 further comprising a web servlet component providing a graphical user interface for use by the user in defining a test request.

19. The system of claim 5 further comprising a parser component for parsing ASCII format test requests defined by the user.

20. The system of claim 6 further comprising a complete job queue for receiving test requests from the job execution process upon the completion of the testing defined by the test request.

21. The system of claim 17 in which the control queries and commands comprise a refresh command, the system further comprising an automated machine refresh subsystem responsive to the refresh command.

22. The system of claim 21 in which the automated machine refresh subsystem is for DOS-based client system computers running a non-DOS operating system for software testing, the automated machine refresh subsystem comprising a stored machine image, a refresh script for modification of the boot.ini and autoexec.bat files on client system computers, the modified autoexec.bat file being configured to modify the boot.ini file and execute drive image software for loading the stored machine image and for rebooting the system into the non-DOS operating system for software testing.

\* \* \* \* \*